(12) United States Patent
Mueller et al.

(10) Patent No.: US 7,959,743 B2
(45) Date of Patent: Jun. 14, 2011

(54) LITHIUM SALTS OF FATTY ALCOHOL SULPHATES FOR CLEANING BOREHOLES, BORING DEVICES AND BORINGS

(75) Inventors: Heinz Mueller, Monheim (DE); Diana Maeker, Monheim (DE); Nadja Herzog, Korschenbroich (DE)

(73) Assignee: Cognis Oleochemicals GmbH, Duesseldorf (DE)

( * ) Notice: Subject to any disclaimer, the term of this patent is extended or adjusted under 35 U.S.C. 154(b) by 761 days.

(21) Appl. No.: 11/631,450

(22) PCT Filed: Jul. 6, 2005

(86) PCT No.: PCT/EP2005/007274
§ 371 (c)(1),
(2), (4) Date: Mar. 3, 2008

(87) PCT Pub. No.: WO2006/007977
PCT Pub. Date: Jan. 26, 2006

(65) Prior Publication Data
US 2008/0234145 A1 Sep. 25, 2008

(30) Foreign Application Priority Data
Jul. 15, 2004 (DE) .......................... 10 2004 034 141

(51) Int. Cl.
*E21B 37/06* (2006.01)
*B08B 3/00* (2006.01)

(52) U.S. Cl. .................... 134/26; 134/2; 134/6; 134/27; 134/28; 507/134; 507/135; 166/304; 510/365

(58) Field of Classification Search .................... 134/26, 134/2, 6, 27, 28, 29; 507/134, 135; 166/304; 510/365; *E21B 37/06*
See application file for complete search history.

(56) References Cited

U.S. PATENT DOCUMENTS

| | | | | |
|---|---|---|---|---|
| 2,470,132 A * | 5/1949 | Bergman | ...................... | 507/215 |
| 3,486,560 A | 12/1969 | Hutchison et al. | | |
| RE29,473 E * | 11/1977 | Fitzgerald, Jr. | ............... | 510/370 |
| 4,288,333 A * | 9/1981 | van Zon et al. | ............... | 507/236 |
| 5,106,516 A | 4/1992 | Mueller et al. | | |
| 5,147,633 A * | 9/1992 | Ramakers | ...................... | 424/56 |
| 5,252,554 A | 10/1993 | Mueller et al. | | |
| 5,254,531 A | 10/1993 | Mueller et al. | | |
| 5,318,954 A | 6/1994 | Mueller et al. | | |
| 5,318,956 A | 6/1994 | Mueller et al. | | |
| 5,348,938 A | 9/1994 | Mueller et al. | | |
| 5,403,822 A | 4/1995 | Mueller et al. | | |
| 5,441,927 A | 8/1995 | Mueller et al. | | |
| 5,461,028 A | 10/1995 | Mueller et al. | | |
| 5,663,122 A | 9/1997 | Mueller et al. | | |
| 5,750,276 A * | 5/1998 | Page | ............................. | 428/703 |
| 5,755,892 A | 5/1998 | Herold et al. | | |
| 5,846,601 A | 12/1998 | Ritter et al. | | |
| RE36,066 E | 1/1999 | Mueller et al. | | |
| 5,869,434 A | 2/1999 | Mueller et al. | | |
| 6,022,833 A | 2/2000 | Mueller et al. | | |
| 6,122,860 A | 9/2000 | Von Tapavicza et al. | | |
| 6,165,946 A | 12/2000 | Mueller et al. | | |
| 6,289,989 B1 | 9/2001 | Mueller et al. | | |
| 6,350,788 B1 | 2/2002 | Herold et al. | | |
| 6,716,799 B1 | 4/2004 | Mueller et al. | | |
| 6,780,829 B1 * | 8/2004 | Kischkel et al. | ............... | 510/445 |
| 6,806,235 B1 | 10/2004 | Mueller et al. | | |
| 6,855,678 B2 * | 2/2005 | Whiteley | ....................... | 510/161 |
| 7,828,902 B2 * | 11/2010 | Kinnaird et al. | ................... | 134/2 |
| 2007/0049500 A1 | 3/2007 | Mueller et al. | | |
| 2007/0142234 A1 | 6/2007 | Mueller et al. | | |
| 2007/0219097 A1 | 9/2007 | Mueller et al. | | |
| 2007/0219098 A1 | 9/2007 | Mueller et al. | | |

FOREIGN PATENT DOCUMENTS

| | | | |
|---|---|---|---|
| DE | 1289005 | * | 2/1969 |
| EP | 0 374 672 B1 | | 3/1993 |
| EP | 0 374 671 B1 | | 3/1994 |
| EP | 0 386 636 B2 | | 12/1997 |
| WO | WO 94/29570 A1 | | 12/1994 |
| WO | WO 95/17244 A1 | | 6/1995 |
| WO | WO 98/19043 A1 | | 5/1998 |

* cited by examiner

*Primary Examiner* — Michael Kornakov
*Assistant Examiner* — Katelyn B Whatley
(74) *Attorney, Agent, or Firm* — Smith Moore Leatherwood LLP

(57) ABSTRACT

The invention relates to a process of cleaning boreholes, boring equipment and borings with an aqueous cleaning of one more lithium salts of alkyl sulfates of formula (I):

$$R\text{—}O\text{—}SO_3^-Li^+ \qquad (I)$$

in which R is a saturated, unsaturated, branched or linear alkyl group containing 8 to 22 carbon atoms, preferably the lithium salts of alkyl sulfates are comprised of a mixture of those in which R is a saturated, linear alkyl groups having 8 to 14 carbon atoms.

27 Claims, No Drawings

LITHIUM SALTS OF FATTY ALCOHOL SULPHATES FOR CLEANING BOREHOLES, BORING DEVICES AND BORINGS

CROSS-REFERENCE TO RELATED APPLICATIONS

This application is a national phase filing under 35 U.S.C. §371 and claims priority to International Application No. PCT/EP2005/007274 which has an International filing date of Jul. 6, 2005, and which designated the United States of America and which claims priority to German Application No. 10 2004 034 141.9, filed Jul. 15, 2004, the entire disclosures of which are hereby incorporated herein by reference.

BACKGROUND OF THE INVENTION

This invention relates to the use of certain fatty alcohol sulfates for cleaning boreholes, drilling equipment and drill cuttings and to processes for cleaning boreholes, drilling equipment and drill cuttings.

In the drilling and development of oil and gas occurrences, cleaning steps have to be introduced at various stages to ensure problem-free drilling and production. Thus, after the actual drilling process, the borehole has to be prepared for the production of oil or gas (completion). To this end, an outer tube or casing has to be introduced and cemented in place to stabilize the borehole. The cement is passed through the casing in an aqueous liquid form, emerges at the lower end of the casing and hardens between the borehole wall and the casing. To guarantee optimal cementing, the borehole wall and the casings have to be freed from adhering residues of the drilling mud and adhering fine-particle solids. If this is not done, the layer of concrete is in danger of developing voids or channels which reduce the stability of the concrete. In addition, residues of the drilling mud and the cement together can form a gelatinous mass which prevents the cement from setting so that the stability of the cement jacket is further reduced.

After the casing has been introduced into the borehole, the actual production tube, which is smaller in diameter than the casing, is installed. In addition, a sealing fluid (or packer fluid as it is also known) is introduced between the production tube and the inner wall of the casing. Before this packer fluid is introduced, the annular space between the casing and the production tube is cleaned. In particular, all fine-particle solids still adhering to the wall of the casing or production tube have to be removed to guarantee the performance of the packer fluid.

The choice of the cleaning composition to perform the functions mentioned above is also determined by the nature of the drilling mud used. In principle, drilling muds are divided into water-based types and oil-based types. Oil-based drilling muds are mainly used today either as so-called "true oil muds", i.e. muds which contain little if any dispersed water, or as so-called invert muds which contain between 5 and 45% by weight of water as dispersed phase, i.e. which form a w/o emulsion. In addition, there are water-based o/w emulsions which contain a heterogeneous finely disperse oil phase in a continuous aqueous phase. Petroleum products, such as mineral or diesel oils, are normally used as the oil phase. However, increasingly more stringent ecological requirements have recently led to the development of synthetic oil phases, for example containing esters of certain fatty acids. Drilling muds based on such ester oils are described, for example, in European patents 386 636, 374 671 and 374 672 and show distinctly improved behaviour compared with petroleum products in regard to their biological degradability and toxicity. Where drilling muds based on synthetic esters are used, the formation of tacky residues on metal surfaces and on the borehole wall are occasionally observed and can also lead to troublesome deposits.

In the same way as the cement used for the cementing process, the cleaning compositions are pumped downwards through the drill pipe in liquid form, emerge at the bottom of the borehole and are forced upwards through the annular space between the tube and the borehole wall. They detach residues of the drilling muds and solid particles adhering to the surfaces and remove them from the borehole. One such process is described in detail, for example, in WO 94/29570. The compositions are normally used in the form of aqueous or non-aqueous solutions or dispersions. However, they may also be added to the drilling mud in concentrated, solid or liquid form. Cleaning compositions for the functions described above may be, for example, mixtures of citric acid, pyrophosphate and potassium salts used in solid or dissolved form. These compositions are suitable both for true oil muds and for invert muds.

WO 95/17244 describes a composition for cleaning surfaces soiled with oil which contain surfactants with HLB values of at least 8 in combination with an oil. Ethoxylated sorbitan fatty acid esters are mentioned as preferred surfactants. Now, although compositions based on ethoxylated sorbitan fatty acid esters develop a favourable cleaning effect, their biological degradability and toxicity do not meet all the requirements of increasingly more stringent environmental legislation.

WO 98/19043 discloses specific soya polyol alkoxylates as highly effective cleaning agents for boreholes and drilling equipment. However, there remains a constant need to improve the environmental compatibility of cleaning compositions and, in particular, to reduce their toxicity and to improve their biodegradability while at the same time increasing their cleaning performance.

Accordingly, the problem addressed by the present invention was to provide cleaning compositions for boreholes, drilling equipment or drill cuttings which would show improved ecological compatibility, above all reduced toxicity, in relation to known compositions for at least the same cleaning performance.

BRIEF SUMMARY OF THE INVENTION

It has been found that specific fatty alcohol sulfates solve the problem stated above. In a first embodiment, the present invention relates to the use of compounds corresponding to general formula (I): R—O—SO$_3^-$Li$^+$, in which R is a saturated, unsaturated, branched or linear alkyl group containing 8 to 22 carbon atoms, for cleaning boreholes, drilling equipment and drill cuttings. The key element of the present technical teaching is the limitation to lithium salts because it is only lithium salts which have the required properties.

DETAILED DESCRIPTION OF THE INVENTION

Alkyl and/or alkenyl sulfates, which are often also referred to as fatty alcohol sulfates, are understood to be the sulfation products of primary alcohols which correspond to formula (I). Fatty alcohol sulfates are, generally, a group of anionic surfactants with the general formula: R—O—SO$_3$X which are obtained, for example, by reaction of fatty alcohols with conc. sulfuric acid, gaseous sulfur trioxide, chlorosulfonic acid or amidosulfonic acid. Fatty alcohol sulfates show good solubility in water, little sensitivity to hardness and—given an adequate chain length—high washing performance. Typical examples of alkyl sulfates which may be used in accordance with the invention are the sulfation products of caproic alcohol, caprylic alcohol, capric alcohol, 2-ethyl hexyl alcohol, lauryl alcohol, myristyl alcohol, cetyl alcohol, palmitoleyl alcohol, stearyl alcohol, isostearyl alcohol, oleyl alcohol, elaidyl alcohol, petroselinyl alcohol, arachyl alcohol, gadoleyl alcohol, behenyl alcohol and erucyl alcohol and the technical mixtures thereof obtained by high-pressure hydrogenation of technical methyl ester fractions or aldehydes from Roelen's oxo synthesis. Alkyl sulfates based on $C_{8-16}$ and, more particularly, $C_{8-14}$ fatty alcohols are particularly preferred. Both pure compounds and mixtures, including technical mixtures, of different compounds corresponding to formula (I) may be used in accordance with the invention.

Fatty alcohols which have $C_{12}$ alkyl chains, i.e. which are based on dodecyl alcohol (trivial name: lauryl alcohol), are particularly preferred. Compounds of formula (I), in which at least 50% by weight of the substituent R has a $C_{12}$ chain, are particularly preferred. Compounds in which the percentage content of $C_{12}$ is greater than 50% by weight are most particularly preferred. In principle, however, the substituents R in formula (I) may also be unsaturated and/or branched.

The lithium salts are used in the form of aqueous solutions. In a preferred embodiment, the solutions contain the salts of formula (I) in quantities of 1 to 35% by weight and preferably in quantities of 5 to 25% by weight. The quantity may vary and is adapted to the nature and extent of the soiling/contamination.

The lithium salts of the fatty alcohol sulfates are used in particular for cleaning boreholes. More particularly, the walls of the borehole itself or even production tubes or casing walls can be cleaned using the compounds according to the invention. Drilling equipment in the context of the invention includes, for example, pipelines and tools which are used in drilling operations and which come into contact with other drilling muds and/or crude oil. In addition, the lithium salts may also be used for cleaning drill cuttings. Drill cuttings accumulate during the drilling process and, in the case of offshore drilling, have to be dumped on the seabed in the vicinity of the drilling platform which can lead to the large-scale introduction of mineral oil into the environment. In order largely to avoid ecological damage to the sea, the cuttings are cleaned and freed beforehand from residues of the drilling mud.

The compositions according to the invention may be used in all cleaning processes known to the expert which are involved in geological drilling both offshore and on land. These cleaning processes include, in particular, the removal of paraffin deposits from borehole walls. Boreholes are normally cleaned by a cleaning fluid being pumped under pressure through the borehole and the deposits being removed from the walls of the borehole by the cleaning fluid. The deposits are then transported from the borehole with the fluid. Accordingly, the present invention also relates to a process for cleaning boreholes in which one of the compositions according to the invention is pumped through the borehole by the method described above.

The compositions may also be used for cleaning preferably oil-covered articles, such as tools, pipelines or drill cuttings which accumulate in geological drilling. To this end, an aqueous solution according to the invention is sprayed onto or applied to the surfaces of the articles or the articles to be cleaned are immersed in the compositions. The oil and other soil types are thus removed from the surfaces. The surfaces are then contacted with water so that the compositions are removed with the soils. For example, the surfaces are sprayed with a jet of water.

Accordingly, the present invention also relates to a process for cleaning the surfaces of drilling equipment or drill cuttings in which the surfaces are first contacted with a cleaning fluid and are then sprayed with water, the lithium salts described above in the form of aqueous solutions being used as the cleaning fluid.

EXAMPLES

The following examples are illustrative of the invention and should not be construed as limiting the scope thereof.

Example 1

Comparing Lithium and Sodium Salts

Measuring the Cleaning Effects

Tests were conducted with the lithium salts according to the invention and the corresponding sodium salts. To this end, quantities of 8 g of a drilling fluid were applied with a brush to the inside of a measuring beaker weighed beforehand. 200 ml of the 5% by weight aqueous cleaning solution were then poured into the beaker, followed by shaking by hand for 3 minutes.

The glass beaker was then placed upside down on a filter paper for 2 minutes. The weight of the measuring beaker was then determined. The reduction in weight is a measure of the cleaning effect. If, theoretically, the measuring beaker reached the weight before the measurement, this would be evaluated as 100% cleaning performance.

The drilling fluid had the following composition:

| | |
|---|---|
| Ester oil $C_{8-14}$ fatty acid-2-ethylhexyl ester | 250 ml |
| Emulsifier (amidoamine) | 10 g |
| Fluid loss additive (hydrophobicized lignite) | 10 g |
| Lime | 1.2 g |
| $CaCl_2 \cdot 2H_2O$ | 27 g |
| Weighting agent (calcium carbonate) | 100 g |
| $BaSO_4$ | 100 g |
| Hymond Prima Clay | 43 g |
| Water | 84 g |

The oil/water ratio was 75:25. The drilling fluid was aged for 16 h at 200° F. (93° C.). The results of the test are set out in Table 1.

TABLE 1

Comparing Lithium and Sodium Salts

| Name | Product | Performance in % |
|---|---|---|
| V1 | Na lauryl sulfate C12/14, 90% (active substance content) | 75 |
| V2 | Na lauryl sulfate C12, 95% (active substance content) | 62 |
| E1 | Lithium lauryl sulfate, C8-12, 30% (active substance content) | 88 |

The products were used as 5% aqueous solutions. The lithium salts according to the invention show a distinctly increased cleaning performance for a reduced input of active substance.

Example 2

Comparing Cleaning Effect of Lithium Lauryl Sulfate v. Soya Polyol Ethoxylate and C8-10 Alkyl-1,5-Glucoside In another test similar to that described above, the lithium salts according to the invention were tested for cleaning performance in comparison with soya polyol ethoxylates (according to WO 98/19043) and commercially available alkyl polyglycosides. The results are set out in Table 2.

TABLE 2

Cleaning Effect of Lithium Lauryl Sulfate v. Soya Polyol Ethoxylate And C8-10 Alkyl-1,5-Glucoside

| Name | Product | Performance in % |
|---|---|---|
| V3 | Soya polyol ethoxylate (5% active substance) | 58 |
| V4 | C8-10 alkyl-1,5-glucoside (63% active substance) | 62 |
| E1 | Lithium lauryl sulfate, C8-12, 30% in water | 88 |

Example 3

Comparing Toxicity of Lithium Lauryl Sulfate v. Soya Polyol Ethoxylate and C8-10 Alkyl-1,5-Glucoside Toxicity Measurements The toxicity of products V3, V4 and the salt E1 according to the invention was measured on *Skeletonema costatum* (to ISO 10253 1988) and *Corophium volutator* (to OSPRACOM Guidelines (1995)—A Sediment Bioassay Using an Amphipod). An aerobic degradation test was also carried out (Marine Bodies ISO/TC 147/SC 5/WG 4 N 141).

The results are set out in Table 3.

TABLE 3

Toxicity of Lithium Lauryl Sulfate v. Soya Polyol Ethoxylate And C8-10 Alkyl-1,5-Glucoside

| Cleaner | *Skeletonema* 72 h EC 50 (mg/l) | *Corophium volutator* 10 d, LC 50 (mg/kg) | Aerobic degradation (28 d) in % |
|---|---|---|---|
| V3 | 16 | 1888 | 36 |
| V4 | 20 | None after 433 | 38 |
| E1 | 33 | 6585 | 98 |

What is claimed is:

1. A process for cleaning the surfaces of drilling equipment or drill cuttings, comprising
   (a) contacting the surface of the drilling equipment or drill cuttings in need of cleaning with an aqueous cleaning solution of one or more lithium salts of alkyl sulfates of formula (I):

$$R-O-SO_3^-Li^+ \quad (I)$$

in which R is a saturated, unsaturated, branched or linear alkyl group containing 8 to 22 carbon atoms, and
   (b) rinsing the surface of the drilling equipment or drill cuttings with water.

2. The process according to claim 1, wherein the aqueous cleaning solution contains between 1 and 35% by weight of the one or more lithium salts of alkyl sulfates.

3. The process according to claim 1, wherein R in formula (I) is an alkyl group containing 8 to 16 carbon atoms.

4. The process according to claim 1, wherein R in formula (I) is an alkyl group containing 8 to 14 carbon atoms.

5. The process according to claim 1, wherein R in formula (I) is a linear, saturated alkyl group.

6. The process according to claim 1, wherein R in formula (I) is a technical mixture of alkyl groups containing 8 to 14 carbon atoms.

7. The process according to claim 5, wherein the linear, saturated alkyl groups are comprised of at least 50% by weight of alkyl groups having 12 carbon atoms.

8. The process according to claim 6, wherein the mixture of alkyl groups is comprised of at least 50% by weight of alkyl groups having 12 carbon atoms.

9. A process for cleaning geological boreholes, comprising pumping through a borehole, an aqueous cleaning solution of one or more lithium salts of alkyl sulfates of formula (I):

$$R-O-SO_3^-Li^+ \quad (I)$$

in which R is a saturated, unsaturated, branched or linear alkyl group containing 8 to 22 carbon atoms.

10. The process according to claim 9, wherein the aqueous cleaning solution contains between 1 and 35% by weight of the lithium salts of alkyl sulfates.

11. The process according to claim 9, wherein R in formula (I) is an alkyl group containing 8 to 16 carbon atoms.

12. The process according to claim 9, wherein R in formula (I) is an alkyl group containing 8 to 14 carbon atoms.

13. The process according to claim 9, wherein R in formula (I) is a linear, saturated alkyl group.

14. The process according to claim 9, wherein R in formula (I) is a technical mixture of alkyl groups containing 8 to 14 carbon atoms.

15. The process according to claim 13, wherein the saturated, linear alkyl groups are comprised of at least 50% by weight of alkyl groups having 12 carbon atoms.

16. The process according to claim 14, wherein the mixture of alkyl groups is comprised of at least 50% by weight of alkyl groups having 12 carbon atoms.

17. A process for cleaning geological boreholes, comprising pumping through a borehole, an aqueous cleaning solution of a mixture of lithium salts of alkyl sulfates of formula (I):

$$R-O-SO_3^-Li^+ \quad (I)$$

in which R is a saturated, linear alkyl group containing 8 to 16 carbon atoms.

18. The process according to claim 17, wherein the aqueous cleaning solution contains between 1 and 35% by weight of the mixture of lithium salts of alkyl sulfates.

19. The process according to claim 17, wherein the aqueous cleaning solution contains between 5 and 25% by weight of the mixture of lithium salts of alkyl sulfates.

20. The process according to claim 17, wherein the mixture of alkyl groups is comprised of at least 50% by weight of alkyl groups having 12 carbon atoms.

21. The process according to claim 1, wherein formula (I) is lithium lauryl sulfate.

22. The process according to claim 9, wherein formula (I) is lithium lauryl sulfate.

23. The process according to claim 17, wherein formula (I) is lithium lauryl sulfate.

24. The processing according to claim 1, wherein the process for cleaning the surfaces of drilling equipment or drill cuttings results in from about 88% to 100% cleaning performance wherein the R in formula (I) is an alkyl group containing 8 to 12 carbon atoms and the aqueous solution contains a 30% active substance content.

25. The processing according to claim 9, wherein the process for cleaning the surfaces of drilling equipment or drill cuttings results in from about 88% to 100% cleaning performance wherein the R in formula (I) is an alkyl group containing 8 to 12 carbon atoms and the aqueous solution contains a 30% active substance content.

26. The processing according to claim 17, wherein the process for cleaning the surfaces of drilling equipment or drill cuttings results in from about 88% to 100% cleaning performance when the R in formula (I) is an alkyl group containing 8 to 12 carbon atoms and the aqueous solution contains a 30% active substance content.

27. A process for cleaning the surfaces of drilling equipment or drill cuttings, comprising (a) contacting the surface of the drilling equipment or drill cuttings in need of cleaning with an aqueous cleaning solution comprising lithium lauryl sulfate, and
(b) rinsing the surface of the drilling equipment or drill cuttings with water.

\* \* \* \* \*